United States Patent [19]
Starbuck

[11] 3,889,611
[45] June 17, 1975

[54] TRASH BURNER CONVERSION UNIT
[76] Inventor: Herman S. Starbuck, 7720 Spirea Dr., Cincinnati, Ohio 45236
[22] Filed: Apr. 23, 1973
[21] Appl. No.: 353,338

[52] U.S. Cl. ................................ 110/18 R; 110/19
[51] Int. Cl. .............................................. F23g 5/00
[58] Field of Search .......... 110/18 R, 18 C, 19, 8 A; 126/224

[56] References Cited
UNITED STATES PATENTS

| | | | |
|---|---|---|---|
| 3,269,340 | 8/1966 | Crawford et al. | 110/8 A |
| 3,498,240 | 3/1970 | Trott | 110/18 |
| 3,548,762 | 12/1970 | Anderson et al. | 110/18 E |
| 3,703,070 | 11/1972 | Pasichnyk | 110/18 R |

Primary Examiner—Kenneth W. Sprague
Assistant Examiner—Larry I. Schwartz
Attorney, Agent, or Firm—J. Warren Kinney, Jr.

[57] ABSTRACT

A self-contained chamber forms a closure for an openended trash storage container to form an enclosed incinerator, the chamber defining a preheat zone for heating ambient air and introducing the air into the storage container under pressure to enhance combustion. There is also provided means for introducing a portion of the preheated air into exhaust conduits contained in the chamber for cooling the exhaust gases and promoting more complete combustion of particulate waste matter.

13 Claims, 8 Drawing Figures

➤ AMBIENT AIR
▶ HEATED AIR
▶ HIGH VELOCITY
▶ EXHAUST GAS
▷ CLEAN EXHAUST

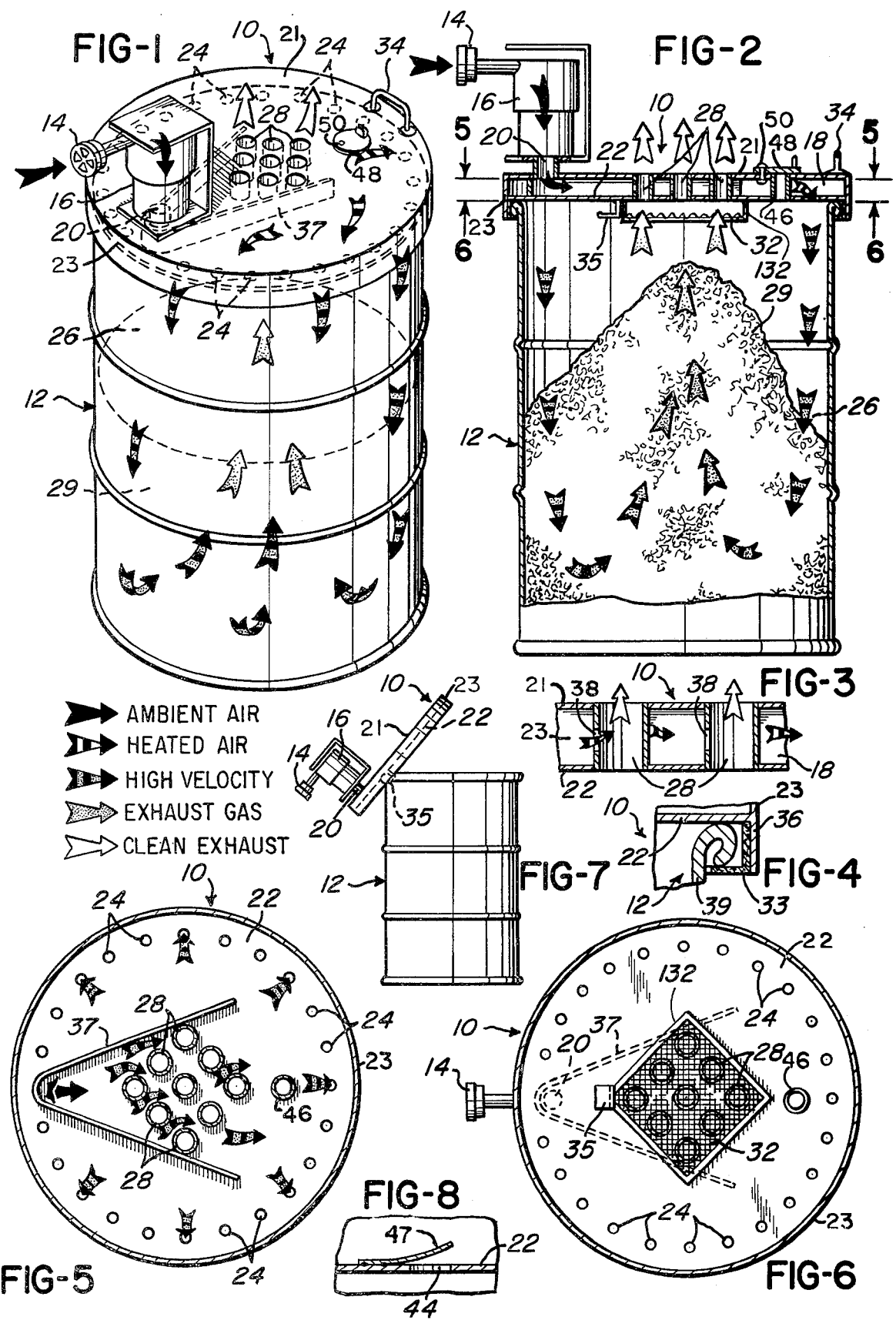

TRASH BURNER CONVERSION UNIT

BACKGROUND OF THE INVENTION

The invention relates generally to a burner for the purpose of disposing of combustible waste material, and more specifically to a self-contained chamber for converting an open-ended receptacle or container into a closed incinerator.

In recent years the problem of waste disposal has increased to monstrous proportions. Individual home owners, small businesses, and similar institutions are prohibited from disposing of leaves, papers and kindred products by open burning, and, generally speaking, many currently used, so-called home incinerators serve as a minimal solution to the current waste disposal problem.

It is, therefore, an object of the present invention to provide means for disposing of combustible waste in a safe, efficient and economical manner. In this regard, the trash burner of the present invention is created by utilizing a self-contained chamber in combination with a standard trash container, for example, typical 20 gallon cans or 55 gallon open-ended drums. The self-contained chamber comprises a closure for the trash container forming a substantially air tight seal around the upper end of the trash storage container. The chamber defines a preheat zone for accepting ambient air under pressure and releasing warmed air into the combustion chamber provided by the storage container. The warmed air aids in drying out the combustible material and speeding the rate of combustion. Further, by utilizing air under pressure, the amount of oxygen in the combustion chamber is increased thus providing a more complete and smoke free combustion of the waste materials. Exhaust ports are provided in the self-contained chamber for exhausting gases of combustion into the environment. A small portion of the preheated or warmed air may be introduced into the exhaust ports to cool the exhaust gases and produce a higher content of oxygen therein, thereby promoting a more complete combustion of the particulate waste material before the by-products of combustion are expelled into the environment.

With these objects of the present invention in mind, a search of the prior art has been made and the following patents have been found to be of interest:

U.S. Pat. No. 2,936,724 discloses an incinerator construction utilizing a corrugated helical conduit, the outer wall thereof placed in communication with the inner wall of an open cylindrical chamber thereby producing channels extending around the cylinder, the corrugated conduit defining a combustion chamber. Air is introduced into the channels created between the outer cylinder and the corrugated conduit and is preheated by heat produced during combustion. Openings provided in the channels permit the heated air to escape into the combustion chamber thereby promoting better combustion of the material stored therein. The exhaust gases are expelled through the top of the incinerator. The device is not suited to be utilized with a standard trash container.

The second patent found to be of particular interest with respect to applicant's invention is U.S. Pat. No. 3,498,240. In this patent a converter unit is designed to fit as a cover over a typical trash container. Ambient air is introduced under pressure into the converter unit and circles around the periphery of the cover before being released into the combustion chamber provided by the trash container. In this manner the air is to be heated before dropping into the combustion chamber and thereby enhance the rate of combustion. However, a preheat chamber is not specifically provided to preheat the air before introducing it into the combustion chamber. The invention further does not provide means for releasing air into the combustion chamber in an even and uniform manner. U.S. Pat. No. 3,498,240 discloses a converter unit for use with a standard trash container to provide an enclosed incinerator for the burning of dry trash, however, this reference does not provide a preheat chamber for trapping and heating ambient air prior to its release into the combustion chamber. The means for preheating the air would be of reduced efficiency here because the ambient air enters at a low temperature and upon meeting the warm air in the combustion chamber tends to immediately drop into the combustion area. Ideally, the air must be captivated in a preheat chamber before being released into the combustion chamber to increase the overall efficiency of the incinerator.

SUMMARY OF THE INVENTION

The present invention is related generally to incinerators and more particularly to conversion units for producing an enclosed incinerator by utilizing a typical trash container as the combustion chamber. The self-contained chamber of the present invention is designed to form a closure for the open end of a typical trash container thereby permitting air to only enter the combustion chamber through ports contained in the chamber housing. The invention further provides means for supplying cool air to the exhaust ports thereby reducing the temperature of exhaust gases and increasing the content of oxygen therein, promoting a more complete combustion.

Ambient air is supplied to the self-contained chamber of the present invention. The system works most efficiently when a slight positive pressure in the neighborhood of 3 inch of water is provided to give a jet action for the air being directed into the burning material. Exhaust ports on the bottom side of the chamber provide air jets and are generally equally distributed adjacent the outside periphery of the bottom plate along with jets placed toward the center but not interfering with the smooth flow of exhaust gases. The flow of preheated air is designed to fan the fire such as used in a forge or a wind fanning a fire across manner, field. In this mannner, with the warm air and the fanning process the speed of combustion is increased thereby increasing the efficiency of the incinerator unit. The slight positive pressure further aids in expelling the exhaust gases through exhaust ports provided in the converter cover. By providing means for entry of ambient air slightly warmed by the preheat chamber into the exhaust ports the exhaust gases are cooled and a higher content of oxygen is enclosed in this region. This promotes a more complete combustion of the combustible materials contained therein.

The invention is also designed to provide a means for agitating the remaining combustible materials stored in the trash container during burning. This permits the agitation of the material thus forcing the ash to the bottom and bringing out fresh material to the top thereby promoting a more complete and more efficient combustion.

While these and other features of the invention will be readily apparent from the accompanying drawings and description, it should be understood that any change in structural detail may be made without deterring from the scope or spirit of the invention.

DESCRIPTION OF THE DRAWINGS

FIG. 1 is a perspective view of the invention illustrated in combination with a suitable trash container, with arrows showing the systematic flow of air.

FIG. 2 is a vertical sectional view of the device of FIG. 1.

FIG. 3 is an enlarged view of a portion of FIG. 2 showing in particular the exhaust ports and means for providing preheated air thereto.

FIG. 4 illustrates in detail the heat seal and form fitting lid portion of the invention forming a closure seal with the trash container.

FIG. 5 is a view taken along lines 5—5 of FIG. 2.

FIG. 6 is taken along lines 6—6 of FIG. 2.

FIG. 7 illustrates the self-contained chamber suspended in an inoperative position from the upper edge of a typical trash container.

FIG. 8 shows modification to the preferred embodiment of the invention, the modification providing an automatic hot air flow control utilizing a bi-metallic strip to selectively open and close ports in the bottom plate of the self-contained chamber, thereby permitting a greater quantity of air to enter the combustion chamber.

DETAILED DESCRIPTION

FIG. 1 illustrates the invention in perspective and in combination with a typical open trash storage container, for example, a 55 gallon drum, or a 20 gallon garbage can. It should be understood that the self-contained chamber housing 10 of the present invention is generally manufactured as a separate unit and is designed to be compatible with a variety of typical trash containers 12. The chamber 18 is formed of upper and lower plates or walls 21 and 22, respectively, held in spaced relationship and enclosed by a side wall 23. The arrows in the bottom of FIG. 1 define the various types of air flow which are illustrated in the combustion chamber and self-contained chamber 18 illustrated in FIG. 1.

Ambient air enters through a regulator valve 14 and a blower 16 into inlet port 20 in communication with the self-contained chamber 18, see particularly FIG. 2. It should be understood that the blower 16 and air regulator 14 can be replaced by and suitable means providing air under pressure to the inlet port 20. The air is then heated by hot gases rising from the combustion chamber 26 defined by the storage container 12. The lower wall or plate 22 of the chamber 18 forms a heat exchanger plate for heating the ambient air as it enters the chamber through inlet port 20. As can be seen by the arrows in FIGS. 1, 2, and 5, the preheated air is then released from the chamber through exhaust ports 24 provided in the lower wall 22 and into the combustion chamber 26. The air released into the combustion chamber 26 is ideally maintained at a positive pressure providing a jet air action, and, due to the rate of the cooler, preheated air with respect to the combustion bi-products, drops to the bottom of the combustion chamber generating a down draft and thereby aiding the rise of the hot air and exhaust gases to the top of the container 12 and through exhaust ports defined by the conduits 28 contained in the self-contained chamber housing 10.

It is desirable to provide a grid or screen plate 32 over the openings in the exhaust conduits 28. A suitable frame 132, or the like, mounted beneath lower wall 22, encompassing the lower open end of conduits 28, supports screen plate 32 in spaced relationship within the lower ends of said conduits, as illustrated in FIGS. 2 and 6. In this manner particulate substances in the exhaust gases may be restricted from expulsion into the environment.

It is also desirable to be able to remove the housing 10 from the container 12 during operation, either for the purpose of agitation or to fill and/or refill the container. This is provided for by the handle 34 attached to upper wall 21 which permits lifting of the housing 10 off the container 12. A hook 35 secured to lower plate 22 is adapted to allow hanging the cover 10 on the upper edge of container 12. Due to the coolness of the ambient air coming into the chamber 18 the handle 34 remains relatively cool throughout the entire burning process, the heat exchanger plate 22 absorbing most of the heat which is then passed to the ambient air as it is heated prior to entering the combustion chamber 26.

By providing a tightly fitting seal between the container 12 and the housing 10, the combustion chamber 26 is relatively air tight and air may only enter the combustion chamber 26 through exhaust ports 24 in the lower plate 22. When the air is introduced into the entry port 20 at a slightly positive pressure the air flow fans the fire and facilitates the removal of exhaust gases by forcing them from chamber 26 and through exhaust ports 28, thus increasing the rate of combustion. This is achieved by utilizing the asbestos heat seal 33 or other heat resistant seal illustrated in FIG. 4. The side wall 23 depends from the lower plate 22, the depending portion 36 being designed to fit the rim 39 of the container 12. By providing the asbestos liner 33 internal of the depending portion 36 the container 12 becomes a closed unit when the housing 10 is placed thereon. The heat escapement from the container at this point, due to the increasing pressure of the hot air is restricted and must pass through the conductive lower plate 22 and into chamber 18. In this manner a relatively air tight container having only exhaust conduits 28 as the means for releasing gases from the container is provided by utilization of the housing 10 with a typical trash container 12.

A lighter opening defined by an open-ended conduit 46 contained in the housing 10, see FIG. 2, is provided for igniting the contents 29 of the container 12 once the housing has been placed on the rim 39 of the container to form a closed combustion chamber 26. The open conduit 46 passes through the chamber 18 and provides access from the outside of the upper plate 21 to chamber 26. In this manner, a lighted match or similar ignition means may be dropped through the conduit 46 to ignite the contents 29. In order to restrict flow of exhaust gases through conduit 46 a lighter cover, or lid 48, is pivotally attached at 50 to selectively close the opening provided by the conduit 46. The lid 48 is simply pivoted to provide access to the lighter opening, and after ignition, is pivoted closed.

The invention also includes means for cooling the exhaust gases expelled through conduits 28 and for increasing the oxygen content thereof to enhance a more complete combustion. A baffle means 37 is contained within the chamber 18 and disposed between upper and lower walls 21 and 22 to provide a channel for directing air entering through inlet port 20 around the exhaust conduits 28. Exhaust conduits 28 are thereby cooled, reducing the temperature of the exhaust gases. Further, as particularly shown in FIG. 3, by introducing a portion of the preheated air from chamber 18 into the exhaust conduits 28 through orifices 38 it is possible to further cool the exhaust gases and to also increase the oxygen content in the exhaust gases, thereby enhancing a more complete combustion of the waste material, thus insuring a smokeless exhaust.

Another modification to the present invention is illustrated in FIG. 8. The modification permits automatic control of the temperature and air flow into the combustion chamber 26 in response to the heat produced by combustion. As illustrated, a bi-metallic flap or cover 47 is attached to the internal surface of lower plate 22. The bi-metallic flap 47 is adapted to substantially cover and close an auxiliary exhaust port 44 in the plate 22 when the chamber 26 is relatively cool. As the heat in the combustion chamber increases beyond a certain level, the bimetallic flap will be caused to bend upward, as shown in FIG. 8, in a manner typical of most bi-metallic thermostats of wide spread use. This permits the passage of a greater quantity of cooler air into the combustion chamber 26 thereby cooling down the temperature in the combustion chamber. In this manner, a relatively constant temperature may be maintained during the combustion process, when desired.

OPERATIONAL MODE

First, one would fill a typical trash container 12 with dried leaves or other combustible refuse 29. While it is advantageous to stack the refuse in a conical arrangement as shown in FIG. 2, thus increasing the burning surface over that of the flat area, it is not necessary and the incinerator system is designed to operate without dependency on the particular loading technique. The housing 10 is then placed over the open end of container 12 to form a closed combustion chamber 26, sealed about the rim 39 by the heat resistant liner 33 contained in depending portion 36 of the side wall 23, see FIG. 4. The lighter cover 48 is then rotated to expose conduit 46. At this time it may be desirable to introduce air flow by adjusting regulating valve 14, the flow depending upon various conditions, for example, the amount of moisture contained in the refuse 29. A lighted match is then dropped through conduit 46 to ignite the refuse. After ignition the cover 48 is rotated to close conduit 46, thus preventing escapement of exhaust gases therethrough. The air flow provided by blower 16 and controlled by regulator 14 is then increased or decreased to achieve the best rate of combustion, producing a smokeless exhaust.

The cool air entering port 20 through the regulator and blower is received by chamber 18 and preheated by passage of heat through conducting plate 22. The warmed air is then released into the combustion chamber 26 through exhaust ports 24 in plate 22. The air circulates through the combustion chamber 26 and is forced downwardly toward the bottom of the refuse pile. In this manner it serves to preheat and dry out the refuse 29, thereby increasing the combustion process and reducing the amount of smoke emitted through exhaust conduits 28. As the air is heated by combustion it passes back up through the refuse pile and out through exhaust conduits 28. A certain amount of preheated air, being cooler than the exhaust gases and being directed by baffle 37, is passed into the exhaust conduits 28 through orifices 38, thereby cooling the exhaust gases and increasing the oxygen content thereof, promoting a more complete combustion of any combustible material. The grid plate 32 restricts particulate matter from being expelled through the exhaust ports 28 with the flow of exhaust gases.

When it is desired to agitate the remaining refuse, during the combustion process, bringing fresh material to the surface, and forcing ash to the bottom of the container 12, the housing 10 may be lifted from the top of the container 12 by handle 34. Due to the constant flow of cool air passing through chamber 18, and the spaced relationship of plates 21 and 22, the handle 34 remains relatively cool during combustion. The housing 10 is lifted from container 12 and hinged on rim 39 at hook 35 as shown in FIG. 8. In this manner access to container 12 is provided. After agitation, filling, or refill, the housing 10 is simply placed back over the open end of container 12 and the burning process continues.

Where the modification illustrated in FIG. 8 is utilized the temperature of the combustion chamber is maintained relatively constant. As the combustion process produces greater quantities of heat the bi-metal strip 47 will bend upward allowing cooler air to enter the combustion chamber through auxiliary port 44. In this manner a relatively fixed temperature may be maintained in the combustion chamber 26.

Therefore, the present invention as here shown and described when adapted to a typical trash container provides an economical and efficient home incinerator unit for elimination of bulk waste. While particular embodiments have been shown and described, it should be understood that the foregoing is merely illustrative and is not intended to limit the scope or spirit of the appended claims.

What is claimed is:

1. A manually portable lid-like device for association with the open top of a container for producing a combustion-supporting environment within the interior of said container, said device comprising a closed chamber having upper, lower and side walls, said chamber including an air inlet port and means secured to and carried by the upper wall thereof for introducing air under pressure into said air inlet port, said lower wall having a plurality of air exhaust ports therethrough wherein said exhaust ports are spaced about and disposed adjacent the periphery of said lower wall, and means for retaining said device over and in closing relationship with the open top of a container.

2. A device as recited in claim 1, Wherein means are associated with said air introducing means for controlling the volume of air introduced into said air inlet port.

3. A device as recited in claim 1, which includes one or more open-ended conduits passing through said closed chamber between said upper and lower walls and wherein the ends of the conduits are in open communication with areas defined by the outer surface of said upper and lower walls.

4. A device as recited in claim 1, wherein there is further included a singular open-ended conduit passing through said closed chamber.

5. A device as recited in claim 4, wherein there is further included a cover plate adjacent one end of said singular open-ended conduit.

6. A device as recited in claim 5, wherein said cover plate is pivotally secured to said upper wall for selectively opening and closing said singular open-ended conduit.

7. A device as recited in claim 1, wherein said lower wall further contains an additional exhaust port and wherein a bi-metallic cover plate is secured to and carried by said lower wall, said bi-metallic cover plate being responsive to heat to selectively open and close said additional exhaust port.

8. A device of the class described, comprising a closed chamber having upper, lower and side walls, said chamber including an air inlet port and a plurality of air exhaust ports; one or more open ended conduits passing through said closed chamber between said upper and lower walls wherein the ends of the conduits are in open communication with areas defined by the outer surface of said upper and lower walls; and baffle means within said chamber disposed between said upper and lower walls and in communication with said air inlet port, said baffle means directing air around said conduits.

9. A device as recited in claim 8, wherein the interiors of said conduits are in open communication with the interior of said closed chamber.

10. A device as recited in claim 8, wherein a screen is disposed adjacent those open ends of said conduits which are in open communication with an area defined by the outer surface of the lower wall of the chamber.

11. A device as recited in claim 10, wherein there is further included a frame mounted beneath said lower wall and encompassing one end of said open-ended conduits, said screen being carried by said frame in spaced relationship with said open-ended conduits.

12. A device for producing a combustion-supporting environment within the interior of an open top container, comprising a closed chamber having upper, lower and side walls wherein said side wall depends beyond the lower wall and wherin a heat resistant liner is secured to, carried by, and disposed about the periphery of said depending portion of the side wall, said chamber including an air inlet port and means secured to and carried by the upper wall thereof for introducing air under pressure inot said air inlet port, said lower wall having a plurality of air exhaust ports therethrough wherein said exhaust ports are spaced about and disposed adjacent the periphery of said lower wall, and means for retaining said device over and in closing relationship with the open top of a container.

13. A method of converting a receptacle open at one end into an incinerator, which comprises the steps of:
 a. applying a closure member to the open end of the receptacle,
 b. introducing a combustion-supporting gaseous media interiorly of the receptacle adjacent the inner surfaces of the side walls and in substantial parallelism with the longitudinal axis of the receptacle,
 c. exhausting the products of combustion centrally of the receptacle,
 d. preheating the combustion-supporting gaseous media prior to being introduced into the receptacle by means of a heat-exchange relationship with the products of combustion, and
 e. adding preheated combustion-supporting gaseous media to the products of combustion being exhausted from the receptacle for further incinerating any unburned particles in the products of combustion.

* * * * *